United States Patent [19]
Hoffman

[11] 3,895,559
[45] July 22, 1975

[54] MILLING MACHINE
[76] Inventor: Robert E. Hoffman, 10290 Farallone Dr., Cupertino, Calif. 95014
[22] Filed: Mar. 21, 1973
[21] Appl. No.: 343,507

[52] U.S. Cl. ............................ 90/14; 90/15; 90/16; 408/129
[51] Int. Cl.² .......................................... B23C 1/06
[58] Field of Search .......... 90/15, 14, 16, 19, 12 R, 90/12 D; 318/345, 162; 269/178; 74/424.8; 408/129, 137

[56] References Cited
UNITED STATES PATENTS

| | | | |
|---|---|---|---|
| 1,135,868 | 4/1915 | Vinyard | 74/424.8 A |
| 2,089,814 | 8/1937 | Ridgway | 90/15 X |
| 3,249,839 | 5/1966 | Fay | 318/345 X |
| 3,413,893 | 12/1968 | Wilson | 90/17 |

Primary Examiner—J. M. Meister
Assistant Examiner—Z. R. Bilinsky
Attorney, Agent, or Firm—Schatzel & Hamrick

[57] ABSTRACT

An improved multi-purpose milling machine for milling a work piece along a desired line of action. The machine includes an electronic control network for controlling the position of the cutting tool relative to the work piece along a plurality of axes responsive to commands of the operator. The electronic control network is adapted for controlling the rate and direction of rotational motion of the cutting tool relative to the work piece and the linear motion and direction of the work piece relative to the cutting tool.

3 Claims, 6 Drawing Figures

PATENTED JUL 22 1975
3,895,559
SHEET 1
FIG. 1
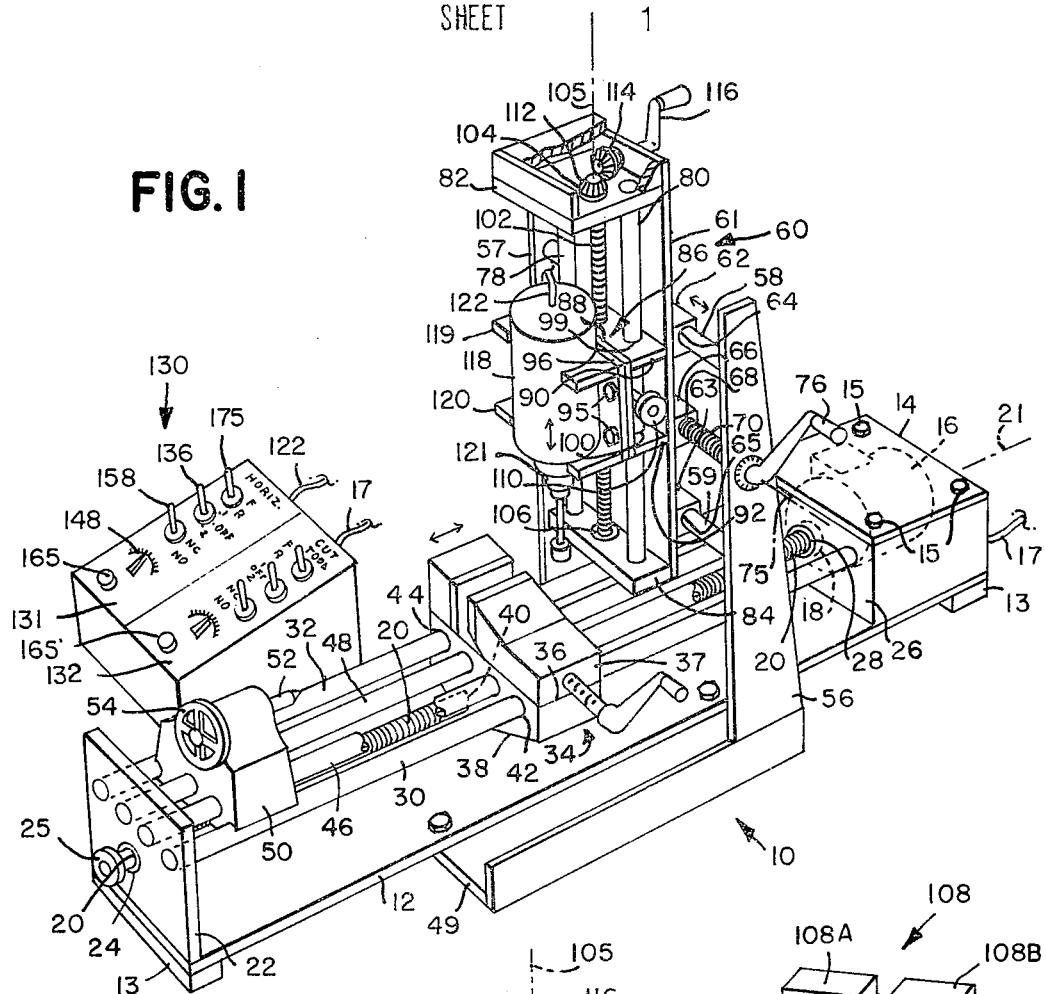
FIG. 2A
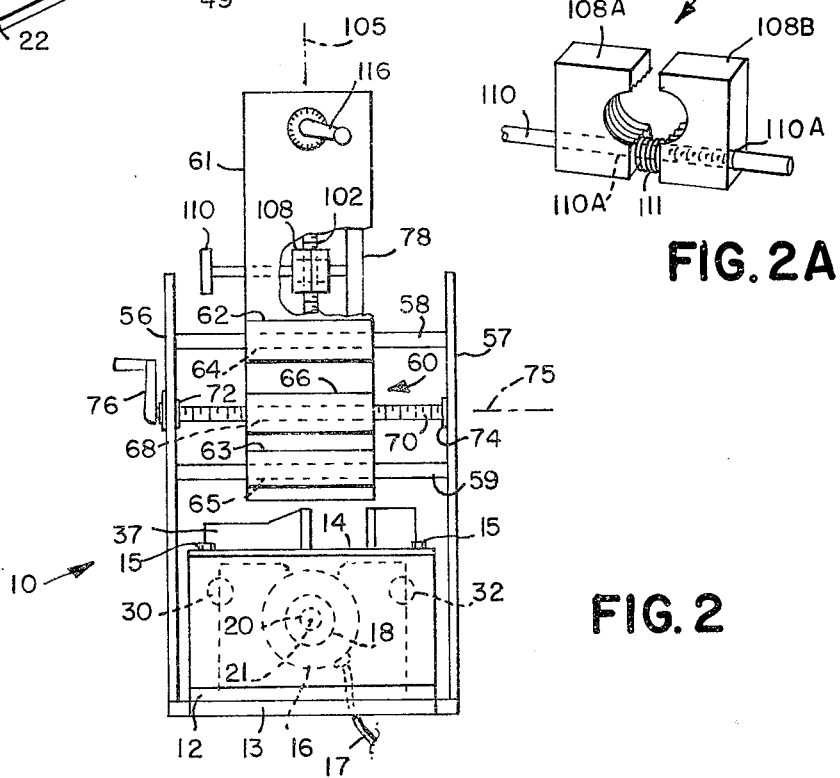
FIG. 2

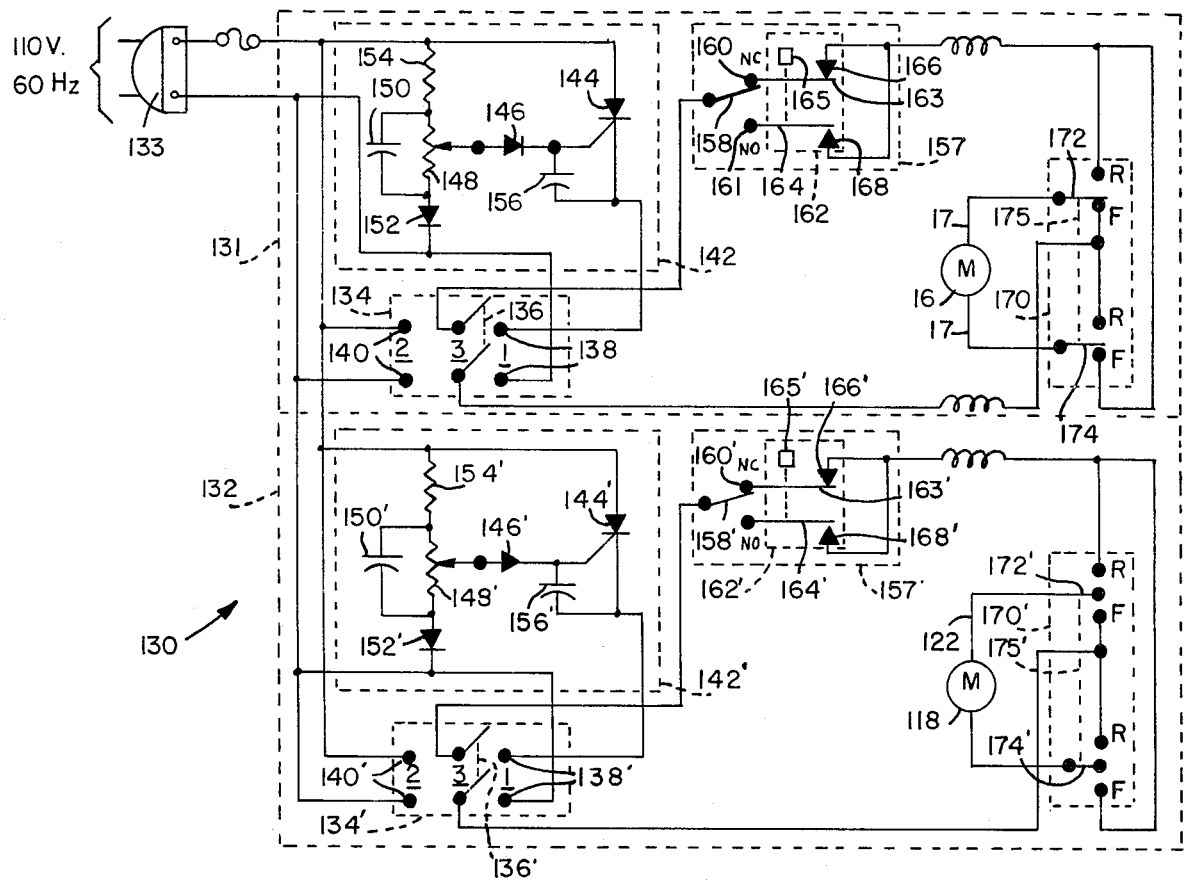
FIG. 3
FIG. 4
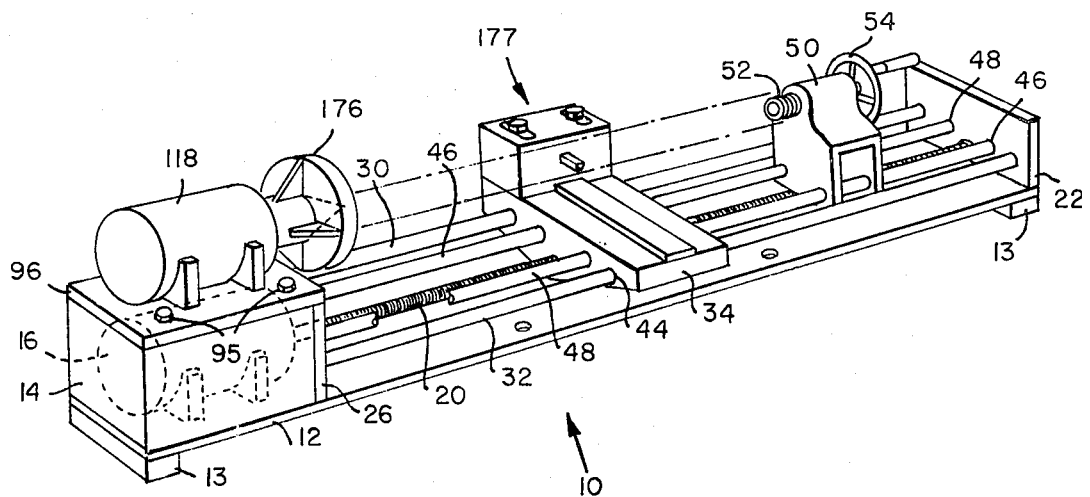

MILLING MACHINE

BACKGROUND OF THE INVENTION

1. Field of the Invention

The present invention relates generally to milling machines and more specifically to an electronically controlled, multi-purpose milling machine in which the rate and direction of rotational motion of the cutting tool relative to the work piece and the relative linear motion and direction of the work piece relative to said cutting tool are controlled.

2. Description of the Prior Art

Milling machines generally refer to power tools for cutting, grinding, working or otherwise shaping solid masses to form parts of desired configurations. For example, frequently it is desireable to mill a solid object of metal, wood, plastic, etc. to a desired configuration to form a mechanical part. The milling may take the form of drilling holes, tapping threads, cutting edges, cutting grooves, cutting surfaces, etc. In such operations the cutting tool is driven relative to the work piece to perform the cutting operation at the area of contact between the tool and work piece and the work piece is moved relative to the cutting tool along a desired path such that the area of contact of the tool and work piece occurs along a desired line of action.

Heretofore, milling machines have been complex in structure, economically expensive and required skilled individuals for proper operation.

Generally, except in the highly complex numerical control machine tools, operation and positioning of the cutting tool relative to the work piece required mechanical controls, complex gearing and clutching. Furthermore, various milling machines heretofore available have limited capabilities as to the milling operations which can be performed.

SUMMARY OF THE PRESENT INVENTION

The present invention provides an improved milling machine capable of performing a multiple of different operations responsive to electronic controls. The machine may be utilized for drilling, tapping, milling and lathe operations on a work piece. In operation the position of the cutting tool relative to the work piece and the rate and direction of rotation of the cutting tool relative to the work piece may be controlled through electronic controls. The machine is adapted to avoid the need for rack and pinion devices for providing and controlling linear motion; belts and pulleys for providing rotary motion of various speeds; mechanical clutches or gear trains requiring changing to achieve various speeds of linear motion.

The present milling machine provides a low cost machine readily adapted for hobbyist and home-workshop use. The machine aids in providing high quality workmanship in an economical manner with a minimum of skill on the part of the operator. The machine also may be adapted for professional large scale usage such as in industrial machine shops.

In an exemplary embodiment, the machine includes a driven horizontal carriage for carrying either a work piece or cutting tool depending on the nature of operations to be performed. For example, for milling, drilling and tapping operations, the horizontal carriage carries and supports a work piece. For lathe operations, the horizontal carriage may carry the cutting tool. The horizontal carriage is driven by a bi-directional, variable-speed motor along a linear path in a horizontal plane. The rate and direction at which the horizontal carriage is driven along the path is dependent upon the motor speed and direction of rotation. The motor speed and direction is controlled through an electronic console including electronic controls for controlling excitation of the motor at the command of an individual operator. At the same time, for drilling, tapping and milling operations the cutting tool (e.g. drill bit, tap bit, mill bit) is engaged to and driven by a bi-directional variable-speed drive motor supported by the machine. The rotational direction and rate of rotation of the cutting tool drive motor are controlled through the electronic console by electronic controls at the command of the operator.

The cutting-tool drive motor may be engaged to a vertical carriage in turn driven by a bi-directional, variable-speed drive to permit electronic control of the rate and direction at which the cutting tool approaches the work piece along the vertical axis. A lateral control including a bi-directional, variable-speed drive may further be included to permit electronic control of the rate and direction at which the cutting tool approaches the work piece along the lateral axis. The vertical and lateral movement control may be realized through the electronic console at the command of the operator. A modification of the machine provides that for tapping operations while the cutting tool drive motor engages a tap bit, the cutting drive motor floats along the vertical plane to facilitate the tapping operation.

Other embodiments and advantages will be in part evident to those skilled in the art and in part pointed out hereinafter in the following description taken in connection with accompanying drawings wherein there is shown by way of illustration and not of limitation preferred embodiments of the invention.

BRIEF DESCRIPTION OF THE DRAWINGS

FIG. 1 is a perspective view of a milling machine of the present invention;

FIG. 2 is an end view of the milling machine of FIG. 1 with a section broken away to more clearly depict the split-nut engaging the vertical lead screw;

FIG. 2A is an enlarged, top perspective view of the split-nut of the machine of FIGS. 1 and 2;

FIG. 3 is a circuit diagram of the electronic control of the machine of FIG. 1;

FIG. 4 is a perspective view of the machine of FIG. 1 assembled for lathe operations;

DETAILED DESCRIPTION OF THE PREFERRED EMBODIMENTS

Figure 5:
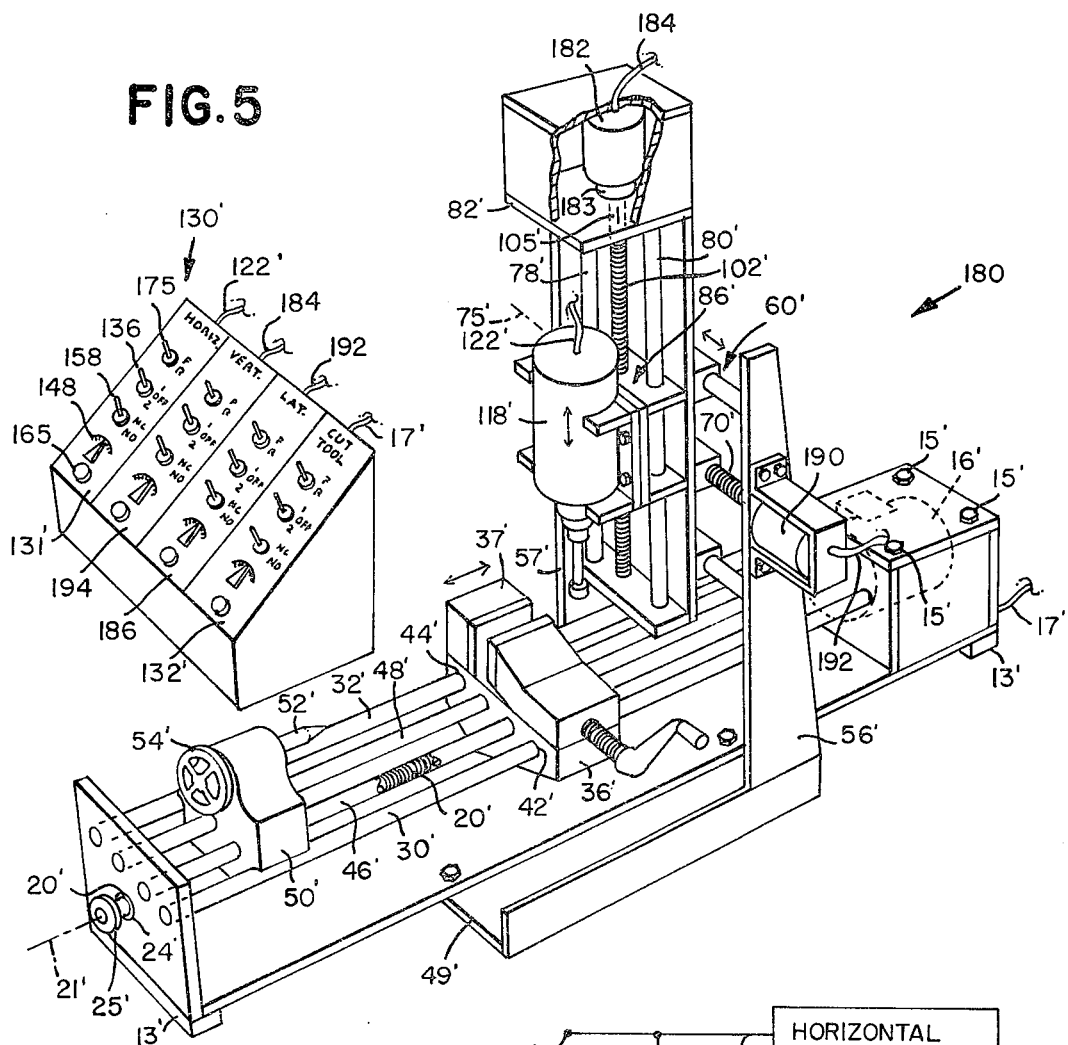
FIG. 5 is a perspective view of an alternative embodiment of the present invention incorporating electronic control means for controlling the relative position of the cutting tool and work piece carriage about three coordinate planes.

Referring to the drawings, FIGS. 1 and 2 depict a multi-purpose milling machine of the present invention and referred to by the general reference character 10. FIG. 1 depicts the machine in perspective and FIG. 2 illustrates the machine as viewed from the right-hand end. The milling machine 10 is adapted for relatively lightweight uses as commonly encountered by hobbyists and home-workshops. Milling operations, including drilling, tapping, grinding, cutting, lathing, etc., may be performed by use of the machine 10 with a minimum of skill on the part of the operator. The machine 10 is adapted to be versatile, relatively low in cost and of relatively small size.

The milling machine 10 includes a support base having a horizontal structure 12 with a pair of feet 13 positioned at opposite terminal ends. A rectangular shaped housing 14 with a set of four apertures 15 is supported about one end of the base 12. Within the housing 14 is an electric bidirectional, variable-speed motor 16. Excitation and electronic control signals to the motor 16 are received through a power cable 17. The motor 16 is engaged to a chuck 18 coupled to one end of a lead screw 20 extending along its longitudinal axis 21 horizontally parallel to the base 12. Lead screw 20 is supported about one terminal end by a vertical bracket 22 and a bearing 24. A hand operable knob 25 is engaged to the terminal end of the lead screw 20 adjacent the bracket 22. Lead screw 20 is further supported adjacent to the chuck 18 by a second vertical bracket 26 and a bearing 28. The brackets 22 and 26 further support a pair of parallel cylindrical support guides 30 and 32 which are longitudinally parallel to the lead screw 20 in an elevated plane relative to the lead screw 20. The guides 30 and 32 are laterally spaced relative to one another and engaged to a horizontal carriage member referred to by the general reference character 34.

The horizontal carriage 34 is adapted to carry a work piece on which milling operations are to be performed. The carriage 34 establishes a horizontal flat surface 36 on which a vise 37 is clamped. The work piece may be secured between the jaws of the vise. The carriage 34 includes a projecting flange 38 carrying an aperture 40 of which the interior walls are threaded for accepting the threaded lead screw 20. A pair of lateral apertures 42 and 44 are included for receiving the guides 30 and 32 such that as the carriage 36 is driven along a horizontal plane the guides 30 and 32 provide support and stabilization to retain the carriage in its horizontal plane.

Accordingly, in operation, the horizontal carriage 34 is adapted to be linearly driven responsive to rotation of the lead screw 20 and to be guided along its horizontal path by the guides 30 and 32. As excitation to the drive motor 16 is controlled, the direction of rotation and the rate of rotation of the lead screw 20 is controlled. The lead screw 20 in turn controls the linear direction and rate of linear motion of the carriage 34 and work piece along the horizontal coordinate plane established by the guides 30 and 32. The knob 25 provides a means for finite hand adjustment by the operator if desired.

Milling machine 10 is further adapted for use as a lathe. As such, a pair of parallel cylindrical support guides 46 and 48 are positioned parallel and intermediate to the guides 30 and 32. Guides 46 and 48 are supported at opposite terminal ends to the vertical brackets 22 and 26. A tail stock 50 is supported by, and slidable along, the guides 46 and 48. A center screw 52 coupled to an adjusting wheel 54 is supported by the stock 50.

The milling machine 10 further includes a pair of removable vertical support columns 56 and 57 astraddle of and projecting vertically from opposite lateral sides of the base 12. The columns 56 and 57 are engaged to a horizontal stabilizing plate 49 bolted to the base 12 and are spaced apart such that the horizontal carriage 34 may be driven intermediate said columns. The columns 56 and 57 support a pair of cylindrical lateral cross-feed support guides 58 and 59 at an elevated position. The guides 58 and 59 are parallel and spaced apart in vertical alignment with one another and are adapted to support and guide a lateral carriage referred to by the general reference character 60. The carriage 60 includes a vertical support base member 61. The base 61 is engaged to a pair of lateral flanges 62 and 63 which are vertically spaced relative to one another. A lateral extending aperture 64 adapted for encompassing the lateral support guide 58 extends through the flange 62. A lateral extending aperture 65 adapted for encompassing the lateral support guide 59 extends through the flange 63. Intermediate the flanges 62 and 63 is a third flange 66 projecting from the base 61. The flange 66 carries an internal threaded aperture 68 adapted to receive a laterally projecting lead screw 70. The lead screw 70 extends intermediate the vertical support columns 56 and 57 in parallel with the support guides 58 and 59. The lead screw 70 is coupled to the vertical column 56 at one end by means of a bearing 72 and to the support column 57 by means of a bearing 74 such that the lead screw is free to rotate about its laterally projecting axis 75. One end of the lead screw 70 is engaged to a turn arm 76 such that rotation and direction of the lead screw may be controlled manually by the operator.

In operation, the direction along the lateral plane and rate of lateral movement of the lateral carriage 60 may be controlled by control of the lead screw 70. The lead screw handle 76 functions as a drive means for laterally driving the lateral carriage 60 in a controlled manner. Turning of the lead screw handle 76 through the coupling of the lead screw 70 with the threaded flange 66 imparts lateral motion to the lateral carriage 60. The lateral direction of movement of the carriage 60 depends upon the direction of rotation of the screw 70.

The front of the lateral carriage 60 supports a pair of vertical support columns 78 and 80 which extend parallel to one another and parallel to the surface of the vertically extending support base 61. The guides 78 and 80 are supported at their opposite terminal ends by a pair of brackets 82 and 84 projecting from the support base 61. The support guides 78 and 80 in turn support a vertical carriage referred to by the general reference character 86.

The vertical carriage 86 includes a vertical flat carriage plate 88 in turn engaged to a pair of flanges 90 and 92 projecting from the backside of the plate 88. The plate 88 carries a set of four apertures for receiving a set of four fastener bolts 95 for securing the plate 88 to a mounting plate 96 as hereinafter described. The flange 90 carries a pair of apertures 99 and the flange 92 carries a pair of apertures 100 for receiving the vertical support guides 78 and 80. Laterally intermediate the guides 78 and 80 is a vertical lead screw 102 which extends parallel to the columns 78 and 80 and is engaged to opposite ends by the brackets 82 and 84. At one terminal end, the lead screw 102 is coupled to the flange 82 by means of a bearing 104 and at the opposite terminal end to the flange 84 by means of a bearing 106 such that the lead screw is free to rotate about its axis 105.

Intermediate the flanges 90 and 92 the carriage 86 carries a flange 108 engaged about the back side of the plate 88 (see FIG. 2). The flange 108 is in the form of a split-nut having internal threads for coupling to the vertical lead screw 102. The split-nut 108 may be released from engagement with the lead screw 102 by means of a split-nut engaged arm 110 having a threaded end portion as hereinafter described. The split-nut 108 is adapted such that it may be disengaged from the lead screw 102 to permit the vertical carriage 86 to float along the lead screw 102. An enlarged plan perspective view of the split-nut 108 is illustrated in FIG. 2A. The split-nut includes two jaws 108A and 108B each carrying a threaded aperture 110A for engaging the threaded portion of the arm 110. A coil spring 111 is positioned about the arm 110 intermediate the jaws 108A and 108B. Thus, as the arm is turned so as to urge the jaws 108A and 108B together about the lead screw 102, the spring is placed under compression. As the arm is turned so as to retract the arm, the spring 111 acts on the jaws thereby causing them to spread apart. With the jaws spread apart, the threads of the jaws 108A and 108B are released from the lead screw 102 and the vertical carriage 86 is floating.

About one terminal end of the lead screw 102 and adjacent to bearing 104 is a drive means in the form of a gear train including a driven gear 112 and a driver gear 114. The driver gear 114 is engaged to an arm 116. Accordingly, the driving of the arm 116 imparts motion to the gear 114 and the driven gear 112 thus controlling the feed screw 102 and the vertical direction and linear motion of the vertical carriage 86.

As illustrated, the vertical carriage 86 supports the mounting plate 96 which is secured to the plate 88 by the fastener bolts 95. Secured to the mounting plate 96 is a bi-directional variable-speed, cutting-tool drive motor 118. The motor 118 is cradled by a pair of flanges 119 and 120 each having a U-shaped cutout to receive the motor. The motor 118 has a chuck 121 adapted for engaging a cutting tool, for example, a drill, tap or milling bit, and to rotate said cutting tool around its axis lying in a vertical plane. The vertical elevation of the motor 118 and the cutting tool is controlled by the position of the vertical carriage 86 which is in turn controlled by the lead screw 102. As hereinafter discussed, the plate 96 is designed such that it may be removed from the carriage 86 and positioned over the housing 14 to provide for lathe operations. For home workshop and hobbyist use, the motor 118 may take the form of a portable hand drill, e.g. one-half inch universal drill which may be removable to permit use of the motor for hand power drill operations.

Electrical excitation to the motor 118 is received through a power cable 122. The power cable 122 from the cutting-tool drive motor 118 and the power cable 17 from the work piece drive motor 16 extend to a control console referred to by the general reference character 130. Control through the control console 130, as hereinafter described in more detail, permits an operator to control both the horizontal carriage 34 and the cutting tool during the milling operation by means of manipulating electrical controls. The position, direction and linear rate of motion of the work piece carried by the carriage 34 as well as the direction of rotation and rate of rotation of the cutting tool carried by the cutting tool motor 118 may all be simultaneously controlled from the console 130.

Thus, in operation, a work piece to be milled may be secured to the horizontal carriage 34, e.g. by means of the vise 37 clamped to the carriage 34. The carriage drive motor 16, responsive to control excitation controls the horizontal position of the carriage 34, the rate at which the carriage is driven along the horizontal plane and the direction of motion. Coincident control of the cutting tool carried by the motor 118 relative to the positioning of the horizontal carriage 34 may be realized by control of the position of the lateral carriage 60 and the vertical carriage 86. Accordingly, in setting up the machine 10 for machining operations, the area of intersection of the cutting tool and work piece may be established first by setting the lateral position of lateral carriage 60 through the arm 76 and then setting the vertical position of the vertical carriage 86 through the arm 116. Then, the line of action at which the cutting tool operates on the work piece may be controlled by controlling the position of the vertical carriage 86 relative to the horizontal carriage 34. For example, for drilling operations, the horizontal carriage 34 may be positioned in line with the vertical axis of the bit held by the motor 118. The motor 16 is then deactivated such that the horizontal carriage 34 is then held stationary and the vertical carriage 86 is driven vertically by control of the arm 116 such that the drill bit penetrates the work piece along a vertical line of action coincident with the axis of rotation of the drill bit. The rate and direction of rotation of the drill bit may be continuously controlled at the console 130.

When milling operations are desired, a milling bit is placed in the chuck 121 of the motor 118. The machine is then set up such that the bit is in line with the horizontal travel path of the horizontal carriage 34. During milling, the cutting tool position is held stationary and the work piece, carried by the horizontal platform 34 is driven along the horizontal path co-inciding with a desired horizontal line of action. The control motor 16 drives the lead screw 20 at a desired rate of rotation to drive the carriage past the cutting tool (milling bit) along the horizontal line of action. The rate and direction of feeding the work piece and the rate and direction of rotation of the mill bit in the chuck 121 may be continuously and simultaneously controlled at the console 130.

As previously described, the control console 130 is adapted to provide for electronic control of the rate and direction of the horizontal carriage 34 and the rate and direction of the cutting-tool drive motor 118. FIG. 3 is a circuit diagram of the console 130 which includes a horizontal feed control network 131 and a cutting-tool feed control network 132 adapted for receiving electrical power from a power plug 133 which may be inserted in a standard 110 volt A.C. power source. The circuits 131 and 132 are adapted for electronic control of universal motors (series-wound ac-dc) wherein the operation may be controlled and electrical feedback is provided so that motor speed is held relatively constant under varying load conditions. Referring first to the network 131 the input power plug extends to a double-pole-double-throw, center-off switch assembly 134 positioned to control excitation to the drive motor 16. The switch 134 has an armature 136 which may be controlled at the console and placed in any of three positions. Position 1 places the motor armature in contact with a pair of poles 138. Position 2 places the armature in contact with a pair of poles 140 and Position 3 (OFF) places the armature intermediate Positions 1 and 2 and functions as a circuit breaker. With the armature 136 in Position 1 the switch 134 ties in a speed control circuit 142 intermediate the motor 16 and the power input terminals 133. With the armature 136 in Position 2, the motor 16 is tied directly to the power source terminals 132.

In Position 1, the speed control circuit 142 is adapted to control excitation to the motor 16 and permit the operator to control the rate of rotation of the motor 16 from the console 130. Circuit 142 includes a control gate, in the form of a silicon controlled rectifier (SCR) 144 in parallel with the motor 16. To control firing of the SCR 144, the gate of the SCR 144 is tied to a diode 146 in series with the wiper arm of a potentiometer 148. The wiper arm of the potentiometer 148 can be controlled from the control console. A charge capacitor 150 is tied across the potentiometer 148. One side of the potentiometer 148 is tied in series with a diode 152 common to one pole of the poles 138. The other side of the potentiometer 148 is tied in series with a resistor 154 extending to the anode of the SCR 144. A suppression capacitor 156 is tied across the gate-cathode of the SCR 144 to by-pass spurious pulses.

In operation the speed-control circuit 142 provides phase-controlled half-wave power to the motor 16, i.e. on the negative half-cycle the SCR 144 blocks current flow in the negative direction. This causes the motor 16 to be driven by a pulsating direct current whose amplitude is dependent on the phase control of the SCR 144. Resistors 148 and 154 along with the diode 152 and capacitor 150 form a ramp-generator section of the circuit 142. Capacitor 150 is charged by the voltage divider formed by resistors 148 and 154. Diode 152 prevents negative current flow during the negative half-cycle and the capacitor 150 discharges through the potentiometer 148 during the negative half-cycle. Adjustment of the potentiometer 148 controls the amount by which the capacitor 150 discharges during the negative half-cycle. Feedback action to retain the motor at a constant preset speed is established through the difference of the motor generated voltage and the level of the voltage of the SCR 144. If the motor speed tends to increase thereby increasing the motor generated voltage, the trigger point of the SCR 144 would alter and occur later thereby slowing the motor. Similarly, if the motor speed decreased, the trigger point would alter so as to occur sooner in the half-cycle thereby providing more power to the motor and speeding it up.

The armature 136 of the switch 134 is tied in series with a pulsing control switch network 157 positioned to provide for momentary pulsing of excitation to the motor 16 when the switch assembly 134 is in either Position 1 or Position 2. The switch network 157 is adapted to permit momentary pulsing of the motor 16 from either the normally-on or normally-off position. The switch network 157 includes a single-throw-double-pole switch 158 having a pair of poles 160 and 161 with the pole 160 designated normally closed (NC) and the pole 161 designated normally open (NO). The position of the switch 158 may be controlled from the console 130. The poles 160 and 161 are each tied to a switch 162 having a pair of spring loaded armatures 163 and 164 ganged to a finger control common arm 165. The control arm 165 may be controlled from the control console. Armatures 163 and 164 are respectively electrically common to the contacts 160 and 161 and positioned for alternative engagement with a pair of contacts 166 and 168. Pressing of the arm 165 controls the contact between the armatures 163, 164 with the contacts 166 and 168. In the NC position as shown, the switch 158 provides for a normally closed circuit with the armature 163 in engagement with the contact 166. The circuit may be pulsed open by pressing the arm 165. With the armature 158 in the NO position, the switch 158 provides for a normally open circuit and the circuit may be pulsed closed by pressing the arm 165.

A reversing switch 170, for controlling the direction of rotation of the motor 16, is included intermediate the pulsing network 157 and the motor 16. The switch 170 has a pair of armatures 172 and 174 ganged together to a common arm 175 which may be controlled from the console 130. Each armature 172 and 174 is associated with a pair of contacts designated F and R such that when the armatures 172 and 174 are in contact with their respective F contacts the motor 16 is connected to rotate in one direction and when the armatures are in contact with their respective R contacts the motor is connected to rotate in the opposite direction. It may be noted that the reversing switch 170 may be controlled with the switch assembly in either Position 1 or Position 2.

Accordingly in operation, the position of the arm 175 of the reversing switch 170 controls the direction of rotation of the motor 16 and thus the linear direction of the horizontal carriage 34. The position of the armature 136 of the switch control assembly 134 determines whether the motor 16 is driven with full power uncontrolled or in a controlled manner. When a controlled manner is desired, the armature 136 is placed in Position 1 to insert the control circuit 142. With the control circuit 142 tied in, the potentiometer 148 may be controlled by the operator to establish the desired rate of linear motion of the carriage 34. The position of the horizontal carriage 34 may be further finely controlled to locate the carriage at the desired final horizontal position by the pulse control arm 165. The pulse control 157 permits the operator to momentarily stop or start the carriage in either direction as set by the armature 175 of the switch 170 and at any rate as set by the control circuit 142. If the armature 158 is set normally open (NO) the armature 165 need be momentarily actuated to close the circuit to in turn pulse the motor 16. With the armature 158 normally closed (NC), the armature 165 may be momentarily actuated to open the circuit.

The illustrated control network 132 for the cutting tool motor 118 is comprised of the same circuitry as that of the control network 131 and for purposes of clarification the components of the circuit 132 carry the same reference numerals as those of the circuit 131 distinguished by a prime designation. In operation, the network 132 controls the cutting-tool motor 118 similar to the manner the network 131 controls the motor 16. The switch assembly 134' establishes whether the motor 118 is driven with full excitation or with controlled excitation through the speed control circuit 142'. With the speed control circuit 142' tied in, the potentiometer 148' controls the rate of rotation of the motor 118. The pulsing control switch network 157' controls momentarily pulsing of the motor 118 from either the selected normally on (NO) or normally closed (NC) position. The reversing switch 170' determines the direction of rotation of the motor.

In operation, assuming the milling machine 10 is to be used for milling a piece of work, the piece of work is secured to the vise 37 clamped to the horizontal support carriage 34. A milling bit is inserted in the chuck 121 of the cutting-tool drive motor 118. The vertical position of the cutting tool relative to the work piece is set through the vertical lead screw 102 by manipulation of the arm 116. The lateral position of the cutting tool is set through the lateral lead screw 70 by manipulation of the arm 76. When the cutting tool and cutting tool motor 118 are in the desired vertical and lateral line of action positions relative to the work piece on the carriage 34, the milling operation is commenced by simultaneous activation of the cutting-tool motor 118 and the horizontal drive motor 16. The horizontal carriage 34 is driven along a horizontal linear path with the milling bit cutting the work piece along the established horizontal line of action. The rate and direction at which the work piece is driven are controlled respectively through the potentiometer 148 and switch armature 175 at the console 130. The direction and rate of rotation of the milling bit are controlled respectively at the console 130 by control of the switch armature 175' and the potentiometer 148'. As the milling operation is conducted, finite machining may be further conducted by controlling the pulse control circuits 157 and 157' by manipulation of the armatures 158, 165, 158' and 165' at the console. To control the depth of the cut in the work piece the vertical feed control arm 116 may be controlled through hand operations. Generally for milling operations the depth is preset and remains stable for each cut. Similarly, to control the lateral position of the cutting tool at the work piece the lateral carriage 60 may be positioned by hand operations of the arm 76. Generally for each individual cut the lateral position is preset and retained stationary during the cut.

If the machine 10 is to be used for drilling and tapping operations, the work piece is generally held stationary and the cutting tool is moved vertically relative to the work piece. To realize the drilling operation the control motor 16 is actuated at the console to horizontally position the carriage 34 such that the work piece is in line with the drill bit carried by the chuck 121. Once the desired horizontal position is set the motor 118 is activated and urged vertically through the arm 116. The speed and rotational direction of the motor 118 are controlled through the circuit 132 at the console 130.

After the hole is drilled, the machine 10 may be used to tap internal threads. For tapping operations the drill bit is replaced with a tap bit in the chuck 121. The horizontal carriage 34 and work piece are left in the same position as when the hole was drilled. The split nut engager 110 is activated such that the split nut 118 is released from the vertical lead screw 102. This leaves the cutting tool and motor 118 in a floating position along the vertical plane. Then the motor 118 is activated in a rotational direction depending upon whether left hand threads or right hand threads are desired. As the tap bit engages the work piece, the tapping operation is self feeding and the rate of feed is self compensating with the motor 118 in the floating position. Once the tap is completed the armature 175 of the switch 170' is switched to the opposite direction and the direction of rotation of the motor 118 reversed. The tap bit then backs out of the newly tapped hole. Once the tapping operation is completed, the engager 110 is reactivated such that the split nut 108 engages the vertical lead screw 102.

To arrange the machine 10 for lathe operations, the plate 96 is released from the vertical carriage 86 by removing the bolts 95. The motor 118 and plate 96 are then secured to the top of the housing 14 as illustrated in FIG. 4 by securing the bolts 95 in the apertures 15. The housing 14 functions as a sub-support means for supporting the motor 118 about one terminal end of the guide rails 46 and 48. A head stock 176 is coupled to the chuck 121. The vertical columns 56 and 57 straddling the base 12 are removed. The vise 37 is removed from the horizontal carriage 34 and replaced with a cutting tool referred to by the general reference character 177. To conduct lathe operations on a work piece, the work piece is positioned intermediate and in engagement with the head stock 176 and the tail stock 50 supported by the horizontal guides, as illustrated in phantom. The cutting tool is positioned laterally relative to the work piece and positionally adjusted to make cuts on the surface of the work piece. The motor 118 is utilized to drive the work piece rotationally while the cutting tool 177 shapes the article. The controls at the control console may be utilized to control the motors 16 and 118 during the lathe operations.

FIG. 5 illustrates in perspective an alternative embodiment of the milling machine of the present invention which is adapted to provide a control means for driving and controlling the machine 10 along the vertical plane and along the lateral plane in addition to the horizontal plane. The machine of FIG. 5, referred to by the general reference character 180, is adapted to replace the manual control of the lateral carriage 60 and the vertical carriage 86 by electronic control means. To provide electronic control of the vertical carriage 86, the milling machine 180 includes a drive motor 182 having a chuck 183 coupled to the vertical lead screw 102'. The motor 182 is a bidirectional, variable speed motor similar to the motor 16'. The motor 182 is engaged to a power cable 184 extending to a control circuit 186 similar to the control circuits 131 and 132. As such the drive motor 182 in conjunction with the control circuit 186, positioned within the control console 130', drives the vertical carriage 86 through the vertical lead screw 102' in a controlled linear direction along the axis 105' to control the direction and rate of travel within the vertical plane.

To provide electronic control of the lateral carriage 60', a bidirectional, variable speed drive motor 190 similar to the motors 16' and 182 is coupled to the lateral lead screw 70' by means of a chuck. The motor 190 carries a power cable 192 extending to a control circuit 194, positioned within the control console 130' and similar to the control circuit 131'. Through means of the control circuit 194 the lateral carriage 60' may be driven and controlled. The direction of movement of the lateral carriage 60' and the speed at which it is driven along its linear path within the lateral plane may be controlled by the operator through the control circuit at the control console 130'.

Figure 6:
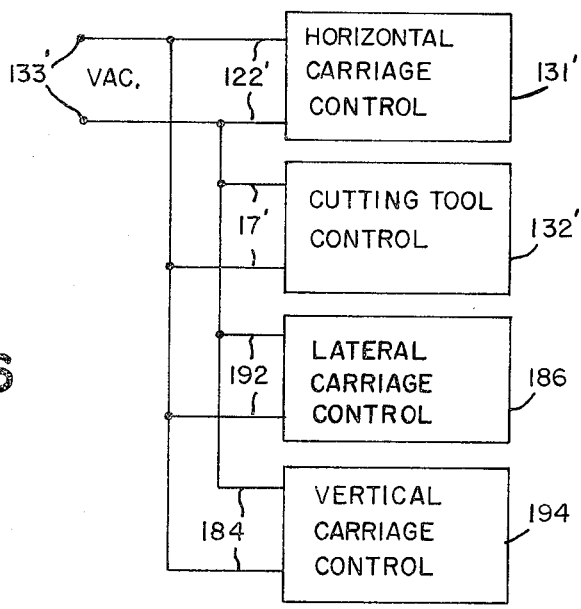
FIG. 6 is a block diagram of the electronic control for the machine of FIG. 5.

As illustrated by the block diagram of FIG. 6, the machine 180 thus includes four separate control circuits mounted in the console 130' such that the operator may individually or simultaneously control the machine 180 along the vertical, horizontal and lateral planes as well as control the speed and direction of the cutting-tool motor.

While, for the sake of clearness and in order to disclose the invention so that the same can be readily understood, specific embodiments have been described and illustrated, it is to be understood that the present invention is not limited to the specific means disclosed. It may be embodied in other ways that will suggest themselves to persons skilled in the art. It is believed that this invention is new and all such changes as come within the scope of the following claims are to be considered as part of this invention.

What is claimed is:

1. A milling machine comprising in combination:

a base structure for supporting a work piece to be milled and a cutting tool to mill said work piece;

a pair of brackets extending vertically from said base structure and laterally spaced from one another, a first threaded lead screw engaged about one terminal end to one of said brackets and about the other terminal end to said other bracket, said first lead screw being supported in a horizontal plane and rotatable about its axis of rotation;

a horizontal travel carriage having an aperture coaxial with said first lead screw, the interior walls about said aperture being threaded with the threads of said first lead screw coupled with the threads about said aperture of said horizontal carriage, horizontal guide means on opposite lateral sides of and parallel with said lead screw and engaged to said horizontal travel carriage to support the horizontal travel carriage relative to said horizontal plane, said horizontal carriage being adapted to receive and secure a work piece thereto whereby said work piece may be positioned within a horizontal plane responsive to rotation of said first lead screw;

a first position drive means including a first variable speed, bidirectional motor coupled to said first lead screw about one of said terminal ends for driving said first lead screw in either rotational direction about its axis of rotation and to in turn drive the horizontal travel carriage in said horizontal plane along said guide means;

a pair of vertically extending support columns astraddle said first lead screw, at least one lateral support guide extending laterally intermediate of and engaged to said pair of support columns at an elevated position relative to said first lead screw, a second threaded lead screw engaged about one terminal end to one of said columns and about the other terminal end to said other column, said second lead screw being supported within a lateral plane and rotatable about its axis of rotation;

a lateral travel carriage having an aperture coaxial with said second lead screw, the interior walls about said aperture being threaded with the threads of said second lead screw coupled with the threads about said aperture of said lateral carriage, said lateral carriage being adapted to support a support base in an elevated vertical plane, and said lateral travel carriage being engaged to said lateral support guide to support the lateral travel carriage relative to said vertical plane;

a second position drive means to said second lead screw for driving said second lead screw in either rotational direction about its axis of rotation to position said lateral carriage in a desired lateral position within said vertical plane;

a pair of spaced-apart support brackets extending from said lateral travel carriage and vertically spaced relative to one another, a third threaded lead screw engaged about one terminal end to one of said spaced-apart brackets and about the other terminal end to said other spaced-apart bracket, said third lead screw being supported in a vertical plane and rotatable about its axis of rotation;

a vertical travel carriage having a releasable split-nut assembly, said split-nut assembly including a pair of U-shaped internally threaded members positioned face-to-face about said third lead screw and a release control means for coupling each of said members about said third lead screw or releasing said members about said third lead screw member responsive to actuation of said release control means, vertical guide means on opposite lateral sides of and parallel with said third lead screw and engaged to said vertical travel carriage to support the vertical travel carriage relative to the vertical plane, said vertical carriage being adapted to receive and secure a cutting tool drive means thereto whereby a cutting tool may be positioned within the vertical plane responsive to rotation of said third lead screw;

a third position drive means coupled to said third lead screw for driving said third lead screw in either rotational direction about its axis of rotation to position said vertical carriage in a desired vertical position;

a cutting tool drive means including a second variable speed, bidirectional motor with a chuck for engaging a cutting tool and supporting said cutting tool in a vertical plane; and an electronic control network having a power input terminal means for receiving electrical power, the network including a first control circuit extending intermediate said input terminal means and said first motor to control the electrical excitation to said first motor and a second control circuit extending intermediate said input terminal means and said second motor to control the electrical excitation to said second motor, said control network including manual control means positioned in a control console to permit said first and second motors to be controlled responsive to manual commands.

2. The milling machine of claim 1 wherein said second position drive means includes a third bidirectional motor engaged to said lateral lead screw;

said third position drive means includes a fourth bidirectional motor engaged to said vertical lead screw; and the electronic control network includes a third control circuit extending intermediate said input terminal means and said third motor to control the electrical excitation to said third motor, and a fourth control circuit extending intermediate said input terminal means and said fourth motor to control the electrical excitation to said fourth motor.

3. A multi-purpose milling machine comprising, in combination:

a base structure for supporting a work piece to be milled and a cutting tool to mill said work piece;

work piece support means engaged to said base structure including a first carriage for supporting the work piece within a first horizontal plane, said first carriage being movable within said first plane along a defined path, a first lead screw supported by the base structure along a first axis defining said path and coupled to said first carriage for advancing said first carriage within said first horizontal plane along said path responsive to rotation of the first lead screw;

a first position drive means including a first variable speed, bidirectional motor engaged to said first lead screw for driving said first lead screw in either rotational direction about said first axis to control the position of said work piece carriage along said path within said first plane;

a cutting tool drive motor means for engaging and driving a cutting tool, said cutting tool drive motor means being engaged to a second carriage supported by the base structure in an elevated position relative to said first carriage and movable within a second plane orthogonal to and intersecting said first plane, the cutting tool drive motor means including a second variable speed, bidirectional motor for engaging the cutting tool and rotationally driving the cutting tool about the axis of the cutting tool;

a second position drive means coupled to said second carriage for controlling the elevational position of said cutting tool drive means within said second plane including a second lead screw supported by said base structure along a second axis and coupled to said second carriage for advancing said second carriage within said second plane responsive to rotation of said second lead screw, a releasable means for interengaging and disengaging said second carriage to said second lead screw and a release control for controlling the releasable means and the interengagement and disengagement of said second carriage and said second leas screw, whereby when said releasable means are disengaged said second carriage and the cutting tool device motor are free to float within said second plane and when said releasable means are interengaged said carriage moves responsive to said second lead screw;

a third position drive means engaged to said second carriage for controlling the position of said second carriage within a third plane orthogonal to and intersecting said first and second planes; and an electronic control network encompassed at least in part within a control console positioned adjacent to the base structure, the electronic control network being electrically engaged to said first and second motors and having a power input terminal means for receiving electrical power for said first and second motors, said electronic control network being adapted to control the rate of rotation and direction of rotation of said first and second motors, a first manually operable electro-mechanical control means positioned about the console and coupled to said electronic control network to permit control of the direction of rotation of said first motor, a second manually operable electro-mechanical control means positioned about the console and coupled to said electronic control network to permit variable control of the rate of rotation of said first motor, a third manually operable electro-mechanical control means positioned about the console and coupled to said electronic control network to permit control of the direction of rotation of said second motor, a fourth manually operable electro-mechanical control means positioned about the console and coupled to said electronic control network to permit variable control of the rate of rotation of said second motor, whereby control of the direction and rate of rotation of said first and second motors may be controlled at the control console by an individual manually manipulating the first, second, third and fourth electro-mechanical control means at the control console.

* * * * *